F. E. HEINIG.
Dinner-Buckets.

No. 143,241. Patented September 30, 1873.

WITNESSES,
Will. B. Boies.
Jas. O. Griffin

INVENTOR,
Fred E. Heinig
by J. G. Hewitt
attorney

UNITED STATES PATENT OFFICE.

FRED E. HEINIG, OF LOUISVILLE, KENTUCKY.

IMPROVEMENT IN DINNER-BUCKETS.

Specification forming part of Letters Patent No. 143,241, dated September 30, 1873; application filed July 17, 1873.

*To all whom it may concern:*

Be it known that I, FRED E. HEINIG, of the city of Louisville, county of Jefferson and State of Kentucky, have invented a certain new and useful Improvement in Dinner-Buckets, of which the following is a specification:

My invention relates to a pail or bucket for containing liquids and solids; and consists in constructing such pail in three parts, two of which may be used for solids, such as bread, meat, &c., and the other, separated from yet connected with them, is used for liquids, as coffee, &c., so that the steam and heat arising from the liquid will not injure the solids. The bucket is made in the form of a cylinder, the top portion of which is divided into two parts, one of which is removable from the other, and has a back attached to it, so as to form a water-tight vessel. This is secured to the other part by hinges, and is provided with a screw-cap or other nozzle, serving as an inlet and outlet. The bottom of this vessel conforms to the shape of the upper portion, and is secured thereto by flanges on its upper edge and on the lower edges of the two upper parts. When the water-tight vessel or liquid receptacle is removed, the lower portion can be sprung in and out of the flange on the other part, and is held in said flange by again hinging the liquid receptacle in its place.

Figure 1:
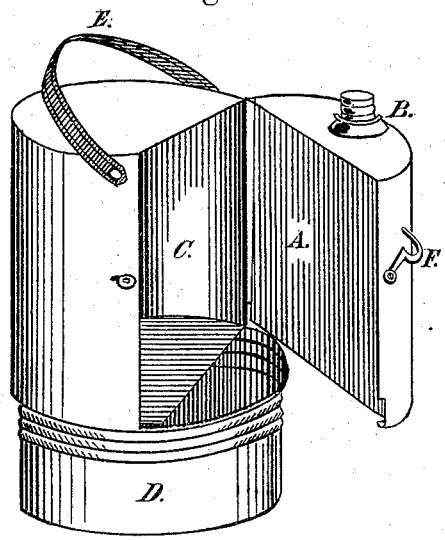
Figure 2:
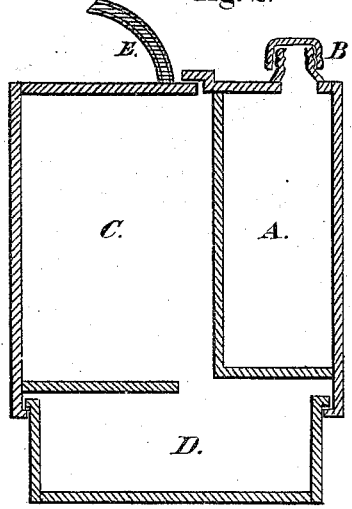

Figure 1 is a perspective view of the bucket, partially open, showing the interior arrangement of the several compartments. Fig. 2 is a sectional view, showing how the several parts are connected with each other.

In the drawing, A is the coffee or liquid vessel, which is formed at the side of the bucket, as described. B is the opening in the top. C is the provision-apartment, all of which is made as shown in the drawings, but may be provided with shelves or other subdivisions. D is the bottom or lower apartment, which may be used for any purpose most suitable. This bottom part may be detached from the remaining part of the bucket, and used as a convenient vessel in eating. E is the bail, by which the bucket is carried. F is the hook for fastening the parts together.

Having thus described my invention, what I claim as new, and desire to secure by Letters Patent, is—

The three-part bucket herein described, constructed with a hinged removable liquid-receptacle, A, and provision-apartments C D, the latter, D, being secured to the bottom of parts A C by flanges, as shown and specified.

FRED E. HEINIG.

Witnesses:
 WILL. B. BOIES,
 JAS. O. GRIFFIN.